Aug. 14, 1962  B. L. BRUCKEN  3,049,654
ELECTRIC MOTOR DRIVEN DOMESTIC APPLIANCE
Filed June 27, 1958  4 Sheets-Sheet 1

INVENTOR.
Byron L. Brucken
BY
Edwin S. Dybvig
His Attorney

Aug. 14, 1962 B. L. BRUCKEN 3,049,654
ELECTRIC MOTOR DRIVEN DOMESTIC APPLIANCE
Filed June 27, 1958 4 Sheets-Sheet 2

INVENTOR.
Byron L. Brucken
BY
Edwin S. Dybvig
His Attorney

Aug. 14, 1962   B. L. BRUCKEN   3,049,654
ELECTRIC MOTOR DRIVEN DOMESTIC APPLIANCE
Filed June 27, 1958   4 Sheets-Sheet 3

INVENTOR.
Byron L. Brucken
BY
Edwin S. Dybvig
His Attorney

Aug. 14, 1962  B. L. BRUCKEN  3,049,654
ELECTRIC MOTOR DRIVEN DOMESTIC APPLIANCE
Filed June 27, 1958  4 Sheets-Sheet 4

INVENTOR.
Byron L. Brucken
BY
Edwin S. Dysing
His Attorney

United States Patent Office
3,049,654
Patented Aug. 14, 1962

3,049,654
ELECTRIC MOTOR DRIVEN DOMESTIC APPLIANCE
Byron L. Brucken, Dayton, Ohio, assignor to General Motors Corporation, Detroit, Mich., a corporation of Delaware
Filed June 27, 1958, Ser. No. 745,126
8 Claims. (Cl. 318—221)

This invention relates to a control circuit for multi-speed motors and more particularly to a control circuit for use with multi-speed washing machines.

With the advent of man-made fabrics, the washing machine art has found it necessary to revise washing procedures to make them adaptable to the new fabrics. For this purpose, the washing machines being marketed currently include a drive mechanism capable of agitating the clothes at two or more speeds. Furthermore, such mechanism is arranged to spin the clothes in a centrifuging operation at two or more speeds to remove the water from the clothes. It should be apparent that variable loads are imposed on and variable speeds are required of any motor utilized in such drive mechanism. During the spin cycle, for instance, a considerable torque is required to initiate the rotation of a laundry tub up to a speed where the water is substantially spun from the tub. As the water is removed and the tub reaches a maximum spinning speed, the torque required is much less. Another situation requiring a degree of motor flexibility arises in cases of blockage tending to stall the motor during either the agitating action or the spinning action. It is desirable to select a motor which will meet these conditions automatically without requiring complicated sensing devices for the various load situations and without requiring the addition of motor control switches to the already complicated washing machine timer. A multi-speed induction motor has the desired operating characteristics to satisfy these load requirements when controlled in accordance with this invention.

Since the synchronous speed of an induction motor depends upon the power frequency and the number of poles, the only methods of varying the speed are to change either or both of these factors. To change the speed by frequency control requires the use of frequency changers, whereas altering the number of poles requires no additional equipment other than the motor control panel. The pole changing method is the simple approach and will provide definite speeds corresponding to the number of poles selected. More particularly, squirrel-cage motors with windings that may be connected for different pole arrangements offer the cheapest and simplest means of obtaining definite speeds, and for this reason they have become very popular. These motors are manufactured for multiple speeds, with constant-horsepower, constant-torque and variable-horsepower and variable-torque. A very simple control is permitted when used in conjunction with two-speed motors having a single winding since they require few leads. The control serves to change the connections of the stator winding, which in turn, causes the motor to run at two speeds— the high speed being approximately twice the low speed. Briefly, the control doubles the number of poles by reversing the current through half a phase of the motor winding. In the washing machine art, a multi-speed motor is required in which the torque varies inversely as the speed, i.e. a constant-horsepower motor. These motors are capable of being operated throughout a wide speed range and adapted for greatest torque at low speed. With the washing machine spin cycle in mind, it should be apparent that high torque starting characteristics are well adapted to initiate a spinning operation of a laundry tub filled with water. As the water spins or flows from the tub and the tub spin speed increases, the torque requirements on the motor lessen, and the full horsepower of the motor is then utilized to spin the tub at high speed.

This invention contemplates sensing and utilizing these varying load situations in a washing machine cycle to automatically control the motor.

Accordingly, it is an object of this invention to provide appliance circuitry for automatically switching a drive motor in accordance with load conditions.

It is also an object to utilize the current draw of an electric multi-speed motor to automatically switch the motor to a desired speed.

It is a further object of this invention to include in a motor control circuit an electrical relay having a coil with a plurality of intermediate taps for obtaining variable current sensitive actuating points for the relay.

A more particular object is the provision of a motor control circuit for a multi-speed washing machine motor wherein the power supply variation to the motor is utilized to drop out a phase or start winding and establish the circuit necessary to give the selected running speed.

Another object of this invention is to provide a control circuit for a multi-speed electric motor having a single start winding and wired for low speed operation, which automatically causes the start winding to drop out without first over-speeding the motor to its high speed cutout point.

A most particular object of this invention is the provision of a washing machine motor control circuit which, with the motor operating at low torque, will automatically switch the motor to high torque operation in accordance with a changed washing machine load.

Further objects and advantages of the present invention will be apparent from the following description, reference being had to the accompanying drawings wherein a preferred embodiment of the present invention is clearly shown.

Figure 1:
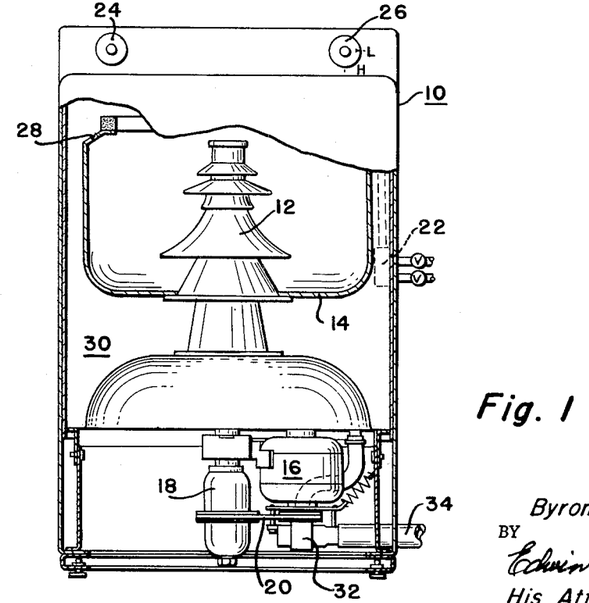
FIGURE 1 is an elevational view of a washing machine, with parts broken away, equipped with a multi-speed motor for reciprocating an agitator and spinning a tub.

In accordance with this invention, a washing machine 10 having an agitator 12 and a tub 14 is provided with a multiple speed motor 16. The motor 16, by means of an agitating and spinning mechanism 18 such as is taught in Sisson 2,758,685 issued August 14, 1956, is adapted to cause the agitator 12 to agitate at two or more speeds and the laundry tub 14 to spin at two or more speeds. A conventional belt drive 20 may be utilized in transmitting the rotative power of motor 16 to the agitating and spinning mechanism 18. Again, in accordance with conventional practice, water may be supplied to the laundry tub 14 through a thermostatic valve arrangement 22. To facilitate selective control of the washing machine operation, the machine may include a timer control 24 and a speed selector 26. With this arrangement of washing machine components the operator may place a load of clothes to be washed within the laundry tub 14 through an access opening (not shown), in the top of the machine 10. The timer 24 may be set to initiate a washing cycle and the speed selector 26 set for either high or low operating speed. If low speed is selected, for instance, the agitator 12 will agitate for a period controlled by the timer 24. At the conclusion of this agitating or washing action, the timer 24 will condition the motor circuit to initiate a removal of the soiled wash water within the tub 14. This is accomplished by spinning the tub in a manner to cause the water to flow through openings 28 in the laundry tub 14 into a collecting chamber 30 disposed below. From the chamber 30 a pump 32 may be utilized to remove the water to a remote drain location by means of a conduit 34. Fresh rinse water is then supplied to the tub 14 through the valve 22 and a second agitation or rinse cycle is initiated by the timer 24. Following this, the rinse water is removed from the tub 14 with another spinning cycle of the tub. Since low speed has been selected, both the agitation and the spinning action are accomplishehd at the low speed of motor 16. During the spinning of tub 14 a variable load is placed on the motor 16, viz. with the tub 14 full of water, a greater resistance to rotation is imposed upon the motor 16 and the motor rotates more slowly at the beginning of the spin cycle. With the reduced rotating speed of the motor, an increased torque is supplied and the motor draws an increased amount of current. As the spin speed of tub 14 increases, the torque requirement of the motor 16 decreases simultaneously with the power or current supply needs of the motor. This variation in power requirements is utilized in accordance with the concepts of this invention to control the motor, as described more fully next following.

Figure 2:
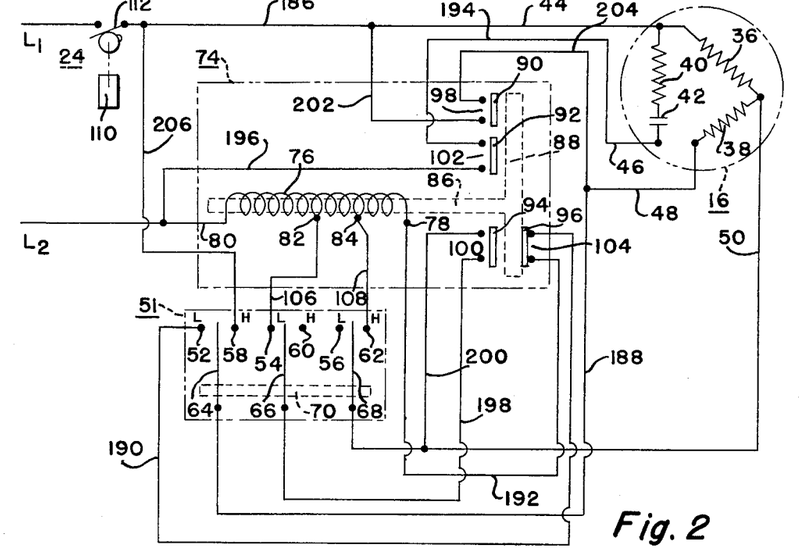
FIGURE 2 is a schematic wiring diagram for automatically controlling a consequent pole motor in accordance with the concepts of this invention.

With reference to FIG. 2, the motor control concepts of this invention are shown in a circuit for a motor 16 which is of the consequent pole type. This motor is wound with a first main winding 36 and a second main winding 38. A start winding 40 is included in an internal motor circuit which includes a capacitor 42. Extending from the casing of motor 16 is a first lead 44, a second lead 46, a third lead 48, and a fourth lead 50. Included in the control circuit with the motor 16 is a manually operated speed selector switch 51 which is designed for either high or low speed setting in accordance with the position of dial 26. The selector switch 51 includes low speed contacts 52, 54 and 56. High speed contacts 58, 60 and 62 are arranged in juxtaposition to the low speed contacts, respectively. Interposed between each pair of high and low speed contacts are a plurality of switch blades 64, 66 and 68 which are moved simultaneously by a connecting bar 70 insulated from the switch blades 64, 66 and 68. The connecting bar 70 is, in turn, connected to the dial 26 on the washing machine casing 10 for operation therewith. Although the switch 26 is shown with provision for operating a two-speed motor, it should be understood that additional contacts within the selector switch 26 may be added for use with a motor having more than two operating speeds.

To embody within this control circuit an automatic operation of the motor 16 in accordance with load conditions on the motor, a current sensitive multiple tap electrical relay 74 is included. The relay 74 includes an actuating coil 76 having termini or end points 78 and 80. Intermediate the end points 78 and 80 are two centrally located tap points 82 and 84. With this construction the current flow in the motor control circuit may be arranged to flow through only a selected portion of the relay actuating coil 76. Also within the relay 74 is an armature 86 reciprocating within the actuating coil 76 and in response to the field created thereby. The armature 86 is connected to a switch contact bar 88 on which are mounted a plurality of switches or bridging members 90, 92, 94 and 96, viz. main winding relay switches 90, 94, start winding relay switch 92 and running relay switch 96. These bridging members are insulated from the switch contact bar 88 by any conventional means and are insulated from each other, as well. The bridging members 90, 92 and 94 are mounted on one side of the armature actuated switch contact bar 88 to close circuits associated with these members, respectively, whenever the field generated by current flowing through the selected portion of coil 76 is sufficient to pull-in the armature 86. Disposed on the opposite side of contact bar 88 is the bridging member or running switch 96 which acts to complete a circuit whenever the relay coil 76 is deenergizer or the current flowing through the coil 76 is insufficient to create the field necessary to pull-in the armature 86. Included within the relay 74 are main winding contacts 98 and 100 which are adapted to be closed by movable bridging members or main winding switches 90 and 94, respectively. Cooperating with the bridging member or start winding switch 92 are start and stall relay contacts 102. Arranged for engagement with relay bridging member or running switch 96 during deenergization of the relay are motor running contacts 104. Thus, a multiple tap current sensitive relay has been taught, wherein the leads or center taps 106 and 108 extend from selected points on the coil 76 intermediate the coil termini 78 and 80.

Completing the control components for the motor circuit of this invention is a conventional cam actuated timer shown generally at 24, which includes a timer motor 110 adapted to actuate a cam operated switch 112. For the purposes of this invention, switch 112 should be maintained in a closed position by the timer 24 so long as motor operation is desired in the clothes washing cycle.

Figure 3:
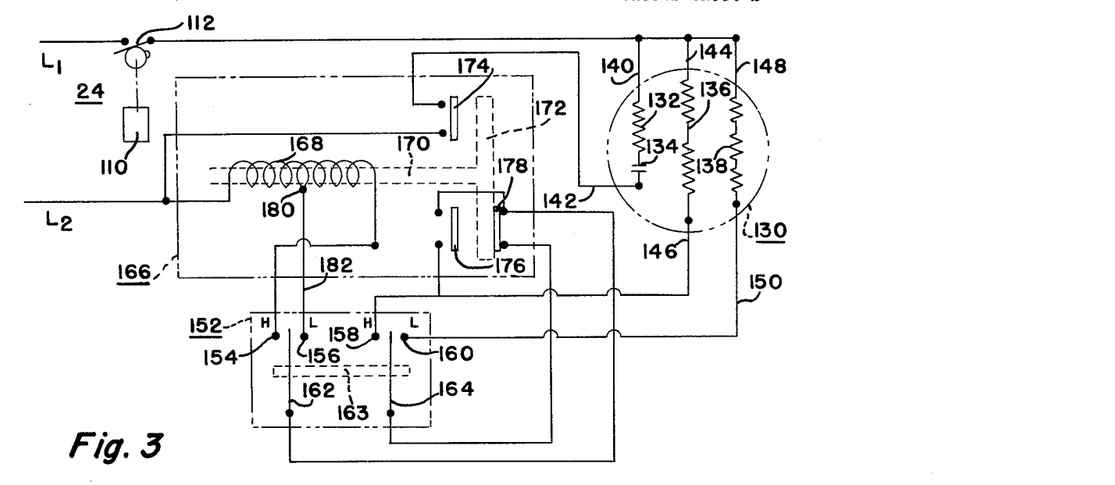
FIGURE 3 is a schematic wiring diagram for controlling a double wound multi-speed motor in accordance with this invention.

When the motor control circuit of this invention is adapted for use with a double-wound motor, the circuitry is somewhat simplified, as best seen in FIG. 3. A double-wound motor 130 is of the conventional type which includes a start winding 132 and a capacitor 134 in series relationship, and main windings 136 for high speed operation and main windings 138 for low speed operation. In this arrangement the motor is generally provided with external leads 140 and 142 for the start winding 132, leads 144 and 146 for the high speed windings 136 and leads 148 and 150 for the low speed windings 138. A speed selector switch 152 includes two sets of speed selector contacts, high speed contacts 154 and 158 and low speed contacts 156 and 160. Movable switch blades 162, 164 are interconnected through and insulated from a connecting bar 163 and arranged to selectively operate between the speed contact pairs 154, 156 and 158, 160, respectively. As in the consequent pole motor circuit the speed selector dial 26 is used to actuate bar 163. A somewhat simplified multiple tap current sensitive relay 166 is required for maintaining automatic load responsive control of the double-wound motor 130. In this regard, the relay includes an actuating coil 168 arranged to pull-in an armature 170. The armature 170 is connected to a bridging contact bar 172 on which are carried and insulated therefrom a start winding and stall bridging member or switch 174 and a high speed start and stall bridging member or switch 176. Disposed on bar 172 for reverse operation from that of bridging members 174, 176 is a running bridging member or switch 178 adapted to close a circuit when the relay 166 is deenergized. The actuating coil 168 is provided with a center tap 180 from which a lead-in line 182 projects outwardly from the relay 166 to engage a contact 156 in the speed selector switch 152. Since the motor control circuit of FIG. 3 is adapted for use with a washing machine, a timer 24, similar to that referred to is connected with FIG. 2, is adapted to energize the motor control circuit whenever motor operation is required in the washing machine cycle. The operation of the circuit set forth in FIG. 3 is believed sufficiently equivalent to the automatic control concepts embodied in FIGURE 2 to be understood in conjunction with the explanation of the FIGURE 2 circuiting as described hereinafter.

In the past magnetic starting relays have been used to drop out a start winding in single speed motors as the motor comes up to speed. To accomplish this, the change in power requirements of the motor during operation sets up a changing current flow which is used to actuate the relay. However, this arrangement has not been applicable to multiple-speed motors in view of the variety of current or power requirements for the various starting and running conditions encountered in a multiple-speed motor. It is known that the pull-in of the relay core or armature is dependent on the product of amperes flowing through the relay coil times the number of turns of the coil. Since the number of coil turns is fixed in any one relay, the pull-in depends on the current draw through the coil. This invention, therefore, encompasses a more flexible actuating relay coil for use with multiple-speed motors wherein multiple taps are located intermediate the ends of the coil. Thus, the number of actuating coil turns is made selectable for the desired motor running speed. Furthermore, with multi-speed motors having a single start winding, this novel arrangement permits the start winding to drop out without first over-speeding the motor to the high speed start winding cutout point, i.e. where the operator desires to select low speed motor operation, the start winding is dropped out during acceleration at a lower motor speed than when the operator selects high speed operation.

Figure 4:
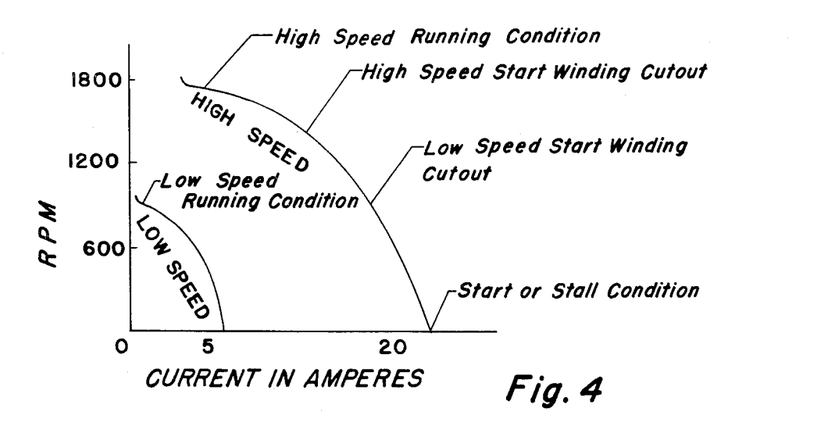
FIGURE 4 is a graph showing typical operating characteristics of a ⅓ H.P., 115 volts, 60 cycle, two-speed motor generally used in domestic washing machines and suitable for use with this invention.

The operating characteristics of a motor adapted to be controlled by the circuitry of this invention are depicted in graphic form in FIG. 4. With motor speed or r.p.m. arranged as the ordinate of the graph and either amperes (motor current draw) or torque (load characteristics effectively handled by a particular motor) arranged as the abscissa, it is shown that speed varies inversely as the current draw and the torque requirements of the motor.

Figure 5:
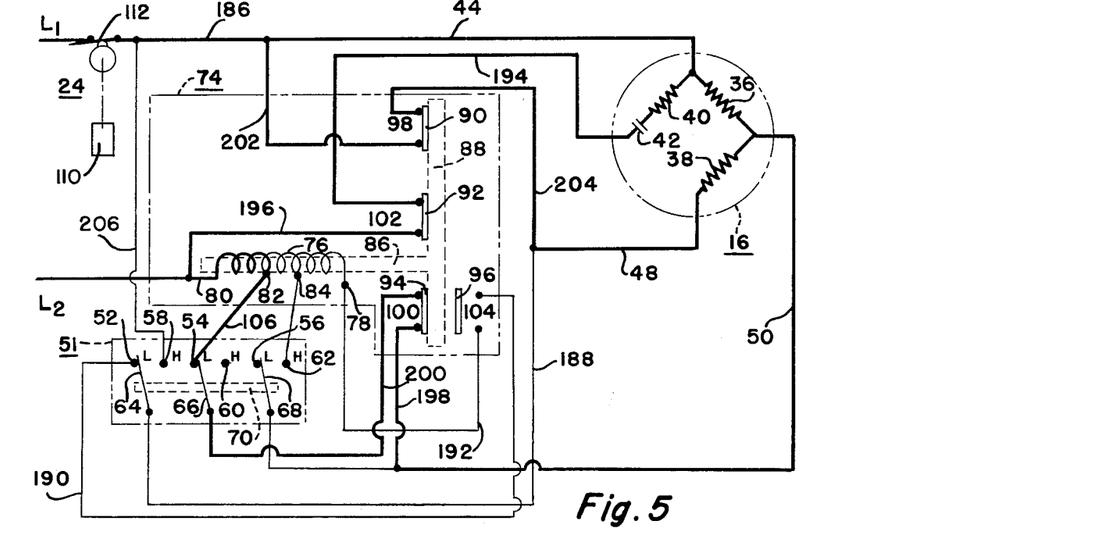
FIGURE 5 is a schematic wiring diagram of a motor control circuit set for low speed operation at start or stall condition.
Figure 7:
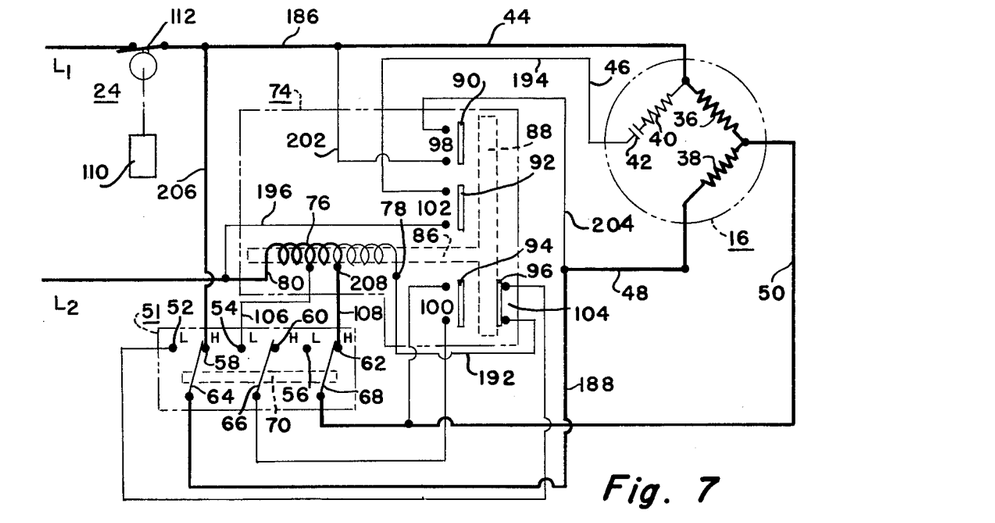
FIGURE 7 is a schematic wiring diagram of a motor control circuit set for high speed operation at running condition.
Figure 8:
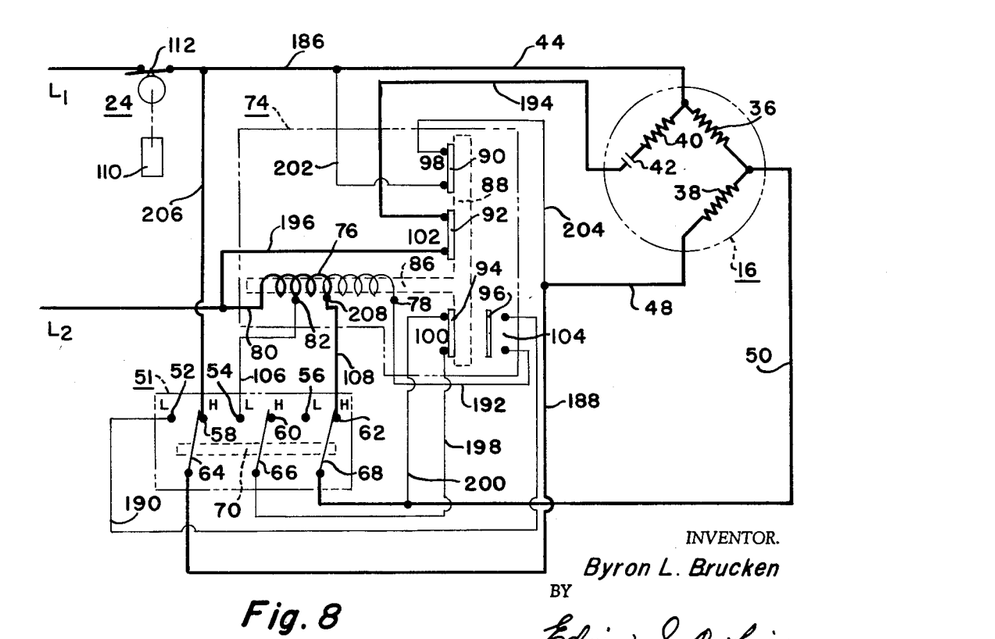
FIGURE 8 is a schematic wiring diagram of a motor control circuit set for high speed operation at start or stall condition.

In multiple speed washing machine operation, six operating situations confront the motor. With the speed selector 26 set for low speed operation (FIGURES 5 and 6), the motor must operate between a start situation, (FIGURE 5) a running situation (FIGURE 6), and a stall situation wherein the motor is over-burdened and must revert to a start condition (FIGURE 5). Similar circuit situations are encountered with the speed selector switch set for high speed operation, viz. start (FIGURE 8), run (FIGURE 7) and stall (FIGURE 8). The circuitry set forth in these last recited figures includes the same circuit components illustrated in FIG. 2, viz. a consequent pole motor 16, a speed selector switch 51, a multiple tap current sensitive relay 74 and a conventional timer 24 adapted to control a circuit energization switch 112. To more fully understand the circuitry set forth in FIGS. 5, 6, 7 and 8, the lines which are energized during any particular motor operating condition or circuit situation are shown heavier than those lines which are selectively deenergized.

FIG. 5 illustrates an 8-pole start arrangement for a consequent pole motor 16 wherein the main windings 36 and 38 are connected in parallel and the timer switch 112 is closed to energize the motor control circuitry. The start winding 40 and capacitor 42 are energized to produce maximum motor torque during the starting load condition. In the case of a washing machine, this load condition would be encountered when the speed selector dial 26 is set for low speed operation and the timer controlled switch 112 has just been closed by the operator in turning on the washing machine. For the situation at the instant of closing switch 112, FIG. 6 should be referred to wherein the relay coil 76 is energized momentarily by means of $L_1$, switch 112, line 186, line 44, main winding 36, main winding 38, line 48, line 188, selector switch blade 64, low speed contact 52, line 190, deenergized relay bridging member 96, line 192, coil 76 (entire coil selected between coil termini 78, 80) to $L_2$. This arrangement completes a circuit through the coil 76 to energize the relay 74 in a manner to pull-in the armature 86, thereby closing main winding relay contacts 98 with bridging member 90, start winding relay contacts 102 with bridging member 92 and main winding relay contacts 100 with bridging member 94. Simultaneously, the circuit initiating contacts 104 are broken with the energization of the relay 74 and the removal of bridging member 96.

The circuitry is now established to place the motor 16 in condition for starting (FIGURE 5). The start winding 40 is now energized by way of $L_1$, switch 112, line 186, line 44, start winding 40, capacitor 42, line 194, bridging member 92, line 196 to $L_2$. It will be apparent that the circuit energizing the start winding 40 bypasses the actuating coil 76 of the relay 74 and is therefore without effect upon the actuation of the relay 74. Under a start situation, the high torque is desired to bring the rotating or driven parts of the washing machine quickly up to whichever operating speed has been selected. For this reason the main windings 36, 38 are wired to produce maximum torque, i.e. wired for high speed operation regardless of the position of the speed selector switch 51; in the winding arrangement illustrated for motor 16, windings 36 and 38 are wired in parallel. Main winding 36, for instance, is fed from $L_1$, timer switch 112, line 186, line 44, main winding 36, line 50, line 198, bridging member 94, line 200, selector switch blade 66, low speed contact 54, intermediate relay tap line 106 and the effective actuating portion of coil 76 between tap-off points 82 and 80, and thus to $L_2$. Main winding 38 is wired in parallel with main winding 36, from $L_1$, switch 112, line 186, line 202, bridging member 90, line 204, line 48, main winding 38 to line 50 from which point the circuit is completed to $L_2$ in the same fashion as was main winding 36. In this relationship the motor 16 will now quickly accelerate from 0 r.p.m. to low running or synchronous speed of approximately 850 r.p.m. on 60 cycle current (see FIG. 4). In so accelerating with the switch 51 set for low speed operation but with the motor 16 actually connected for high speed operation, the graph illustrates the decrease in current draw (amperes) in the parallel wired running windings from approximately 22 amperes to approximately 18 amperes as the motor approaches low running speed. With low speed selected the current which flows through the main windings 36, 38 in parallel flows also through that portion of the relay actuating coil 76 between coil points 82 and 80. Although the current draw of approximately 22 amperes at the initiation of the low speed motor operation (motor windings 36, 38 connected in parallel in a manner equivalent to a high speed operation) is sufficient to actuate the relay in flowing through the reduced number of coil turns, the decreasing current draw in the main or running windings as the motor accelerates produces a continuously lessening pull-in effect on the relay armature 86. At approximately the selected low running speed of 850 r.p.m., the field generated by the selected portion of actuating coil 76 is insufficient to maintain the armature in a pulled-in relationship and the relay 74 is deenergized. Thus, the main winding relay contacts 98, 100, and start winding relay contacts 102 are broken at the same time that motor running contacts 104 are made. The motor 16 is now in a steady state synchronous low speed running condition, illustrated in FIG. 6 with the main windings in series, and is thereby drawing minimum current. It will be noted that the deenergization of relay 74 causes bridging member 96 to close a circuit which places the entire length of coil 76 in current sensing relationship to the running windings 36, 38. Thus the circuit is automatically established to sense stall conditions.

In other words the novel switching arrangement of this invention recognizes that the motor torque produced in either the start or run windings during acceleration to low running speed is below maximum value. For this reason the start winding 40 is not dropped out of the circuit until full low speed running conditions are reached. Just prior to the point of start winding drop out, current is being sensed in the portion of coil 76 between 80 and 82 while main windings 36 and 38 are connected in parallel. As the relay 74 is deenergized, circuits are established which drop out the start winding and connect the main windings 36, 38 in series. Thus the entire coil 76 is placed in the circuit to sense the reduced current draw during low speed run.

Figure 6:
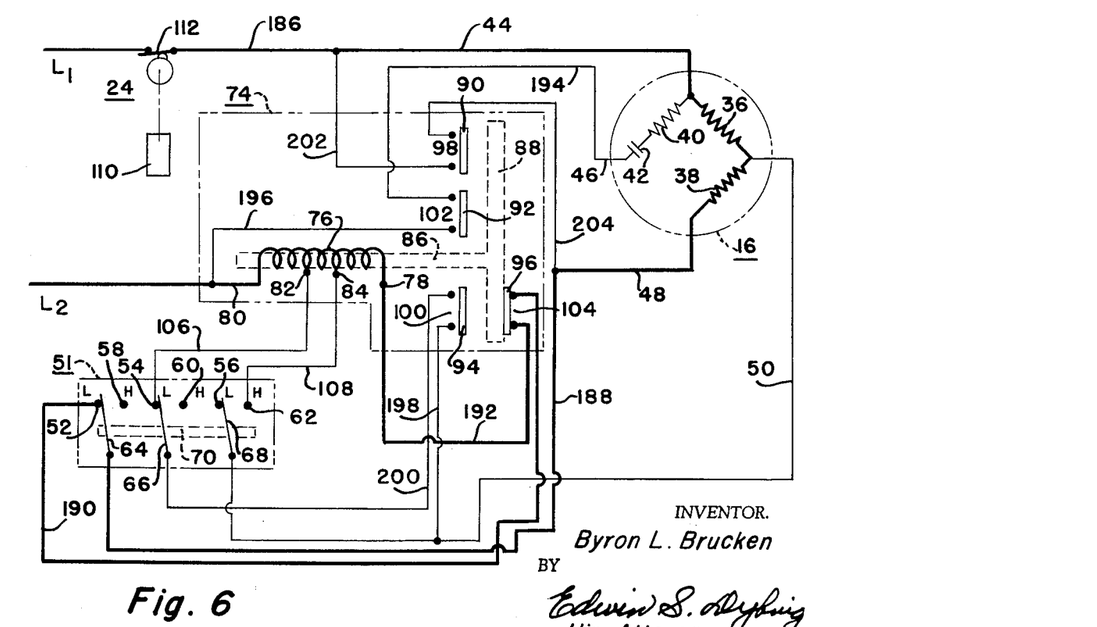
FIGURE 6 is a schematic wiring diagram of a motor control circuit set for low speed operation at running condition.

At the conclusion of the brief interval during which the motor is wired in accordance with the start circuitry of FIG. 5, relay 74 and start winding 40 are deenergized and the main windings 36, 38 placed in series running operation in accordance with the circuitry established at the termination of the starting cycle and the selection on switch 51 of low speed motor operation (FIGURE 6). In this regard, main windings 36, 38 are energized from $L_1$, timer switch 112, line 186, line 44, main windings 36, 38, line 48, line 188, selector switch blade 64, line 190, relay bridging member 96, line 192, relay actuating coil 76 to $L_2$. Since the circuitry thus established places the entire length of coil 76 in the circuit of the motor main winding, a lesser current flow through the windings of coil 76 is required to actuate the relay 74. To repeat, the pull-in of the relay armature 86 is dependent on the product of ampere draw times coil turns. Since the number of turns of coil 76 placed in the circuit by the selection of low speed is maximum under run conditions, the armature pull-in or relay actuating point is effective with a lesser current draw than is necessary to actuate the relay when the intermediate relay tap lines 106 or 108 are in the circuit.

Let us now assume that the motor 16 is operating in the selected low speed to cause the agitator 12 to gently agitate the clothing being washed in tub 14. Let us further assume that the clothing lumps or gathers in a fashion tending to bind or stall the action of agitator 12. This increased burden is transmitted through the agitating and spinning mechanism 18 to the motor 16 and consequently slows the rotational speed of the motor. As explained in connection with the motor operating characteristic graph of FIG. 4, a reduction in motor speed creates an increased current draw along with an increased availability of torque to overcome the blockage or impediment at the agitator 12. The increased current draw flows through the same circuitry just set forth for the low speed running situation of FIG. 6. However, the increased current flowing through the entire coil 76 operates to energize the relay 74, thereby breaking the motor running contacts 104 and making simultaneously therewith main winding relay contacts 98, 100 and start winding contacts 102. The circuitry now established by the automatic operation of the relay 74 in response to the changed load condition imposed by the washing machine upon the motor 16 is now identical to the low speed motor start situation illustrated in FIG. 5. In this regard the motor 16 is now wired for maximum torque (start winding energized; main windings in parallel) to overcome the condition tending to stall the motor and thus quickly to accelerate the motor to its running speed at which point the relay will again deenergize to establish the run circuitry of FIGURE 6 (start winding deenergized; main windings in series). It will be apparent from the above explanation that the motor 16 is switched automatically between a start-stall circuitry and a selected speed running circuitry without further attention by the operator or additional sensing mechanism within the timer.

Where the operator of the washing machine 10 desires a high speed washing machine operation both with reference to agitation and spin, the cabinet dial 26 is manually turned to indicate high speed which, in turn, places the speed selector switch 51 in condition for high speed operation of the motor 16. The components of the circuitry illustrated in FIG. 8 remain identical to those utilized in conjunction with the low speed operation of FIG. 5, viz. the circuit is comprised of a timer operated switch 112, a multiple tap current sensitive relay 74, a speed selector switch 51 and a multiple speed consequent pole motor 16. Motor 16, when wired in a salient or four pole arrangement, produces the high speed running condition of FIG. 7 whereas the circuitry which establishes a consequent or eight pole arrangement places the motor 16 in condition for the consequent pole low speed operation of FIG. 6. With high speed selected (FIGURE 7), the initial impulse to energize the relay 74 and to start the motor 16 is from $L_1$, switch 112, line 186, line 44, main winding 36 to line 50. In parallel relationship to main winding 36, the main winding 38 is energized by way of $L_1$, switch 112, line 206, high speed contact 58, selector switch blade 64, line 188, line 48 and main winding 38 to line 50. Thus, the windings 36, 38 are fed in parallel from line 50, selector switch blade 68, high speed contact 62, relay center tap 108, tap point 208 (tap point 208 in FIGURES 7 and 8 is the same as tap point 84 in FIGURES 2, 5 and 6) on relay actuating coil 76 to coil terminus 80 and $L_2$. This momentary impulse creates a sufficient current draw in the selected portion of coil 76 to actuate relay 74 and pull-in the armature 86 and thereby close main winding contacts 98, 100, and start winding contacts 102 by bridging members 90, 94 and 92, respectively. Simultaneously therewith, bridging member 96 opens motor running contacts 104. The start winding 40 is thus energized from $L_1$, switch 112, line 186, line 44, start winding 40, capacitor 42, line 194, bridging member 92, line 196 to $L_2$. The crcuit established to place the main windings 36 and 38 in parallel remains the same as described immediately aforesaid in connection with the impulse necessary to actuate the multiple tap relay 74. Again with reference to FIG. 4, the motor 16 will accelerate on the high speed curve from 0 r.p.m. to a speed approximately 80% of the speed value selected on switch 51, the 80% figure being the point at which motor torque is generally maximum. In this case, since high speed was selected, the motor will accelerate to approximately 1400 r.p.m. before dropping out the start winding 40. The graph of FIG. 4 clearly illustrates the decreasing current requirement as the motor speed increases. This decrease in current requirement of the motor during acceleration is sensed by that portion of the actuating coil 76 placed in the motor circuit in accordance with the position of speed selector switch 51. In high speed, the length or number of poles selected from coil 76 is that portion between tap-off points 208 and coil terminus 80. Since this number of coil turns or length of coil 76 is greater than the coil turns intercepted between tap-off point 82 and terminus 80 coil length placed in the motor circuit when selector switch 51 is on low speed (FIGURE 5), a lesser current draw is necessary to produce the same relay actuating product of amperes times coil turns. With low speed selected start winding cutout or drop-out point of relay 74 occurs when motor 16 is at approximately 700 r.p.m. On the graph, this corresponds to a higher current draw than exists at the high speed start winding cut out point. With these facts in mind it should now be apparent that a relay may be designed with a selectively sectional coil in which an armature can be made actuatable in accordance with any particular current flow through the relay.

During acceleration at the moment the current draw for motor 16 flowing in coil segment 208 to 80 falls below that figure necessary to energize the relay as predeter- 182 projects outwardly from the relay 166 to engage a contact 156 in the speed selector switch 152. Since the motor control circuit of FIG. 3 is adapted for use with a washing machine, a timer 24, similar to that referred to is connected with FIG. 2, is adapted to energize the motor control circuit whenever motor operation is required in the washing machine cycle. The operation of the circuit set forth in FIG. 3 is believed sufficiently equivalent to the automatic control concepts embodied in FIGURE 2 to be understood in conjunction with the explanation of the FIGURE 2 circuiting as described hereinafter.

In the past magnetic starting relays have been used to drop out a start winding in single speed motors as the motor comes up to speed. To accomplish this, the change in power requirements of the motor during operation sets up a changing current flow which is used to actuate the relay. However, this arrangement has not been applicable to multiple-speed motors in view of the variety of current or power requirements for the various starting and running conditions encountered in a multiple-speed motor. It is known that the pull-in of the relay core or armature is dependent on the product of amperes flowing through the relay coil times the number of turns of the coil. Since the number of coil turns is fixed in any one relay, the pull-in depends on the current draw through the coil. This invention, therefore, encompasses a more flexible actuating relay coil for use with multiple-speed motors wherein multiple taps are located intermediate the ends of the coil. Thus, the number of actuating coil turns is made selectable for the desired motor running speed. Furthermore, with multi-speed motors having a single start winding, this novel arrangement permits the start winding to drop out without first over-speeding the motor to the high speed start winding cutout point, i.e. where the operator desires to select low speed motor operation, the start winding is dropped out during acceleration at a lower motor speed than when the operator selects high speed operation.

The operating characteristics of a motor adapted to be controlled by the circuitry of this invention are depicted in graphic form in FIG. 4. With motor speed or r.p.m. arranged as the ordinate of the graph and either amperes (motor current draw) or torque (load characteristics effectively handled by a particular motor) arranged as the abscissa, it is shown that speed varies inversely as the current draw and the torque requirements of the motor.

In multiple speed washing machine operation, six operating situations confront the motor. With the speed selector 26 set for low speed operation (FIGURES 5 and 6), the motor must operate between a start situation, (FIGURE 5) a running situation (FIGURE 6), and a stall situation wherein the motor is over-burdened and must revert to a start condition (FIGURE 5). Similar circuit situations are encountered with the speed selector switch set for high speed operation, viz. start (FIGURE 8), run (FIGURE 7) and stall (FIGURE 8). The circuitry set forth in these last recited figures includes the same circuit components illustrated in FIG. 2, viz. a consequent pole motor 16, a speed selector switch 51, a multiple tap current sensitive relay 74 and a conventional timer 24 adapted to control a circuit energization switch 112. To more fully understand the circuitry set forth in FIGS. 5, 6, 7 and 8, the lines which are energized during any particular motor operating condition or circuit situation are shown heavier than those lines which are selectively deenergized.

FIG. 5 illustrates an 8-pole start arrangement for a consequent pole motor 16 wherein the main windings 36 and 38 are connected in parallel and the timer switch 112 is closed to energize the motor control circuitry. The start winding 40 and capacitor 42 are energized to produce maximum motor torque during the starting load condition. In the case of a washing machine, this load condition would be encountered when the speed selector dial 26 is set for low speed operation and the timer controlled switch 112 has just been closed by the operator in turning on the washing machine. For the situation at the instant of closing switch 112, FIG. 6 should be referred to wherein the relay coil 76 is energized momentarily by means of $L_1$, switch 112, line 186, line 44, main winding 36, main winding 38, line 48, line 188, selector switch blade 64, low speed contact 52, line 190, deenergized relay bridging member 96, line 192, coil 76 (entire coil selected between coil termini 78, 80) to $L_2$. This arrangement completes a circuit through the coil 76 to energize the relay 74 in a manner to pull-in the armature 86, thereby closing main winding relay contacts 98 with bridging member 90, start winding relay contacts 102 with bridging member 92 and main winding relay contacts 100 with bridging member 94. Simultaneously, the circuit initiating contacts 104 are broken with the energization of the relay 74 and the removal of bridging member 96.

The circuitry is now established to place the motor 16 in condition for starting (FIGURE 5). The start winding 40 is now energized by way of $L_1$, switch 112, line 186, line 44, start winding 40, capacitor 42, line 194, bridging member 92, line 196 to $L_2$. It will be apparent that the circuit energizing the start winding 40 bypasses the actuating coil 76 of the relay 74 and is therefore without effect upon the actuation of the relay 74. Under a start situation, the high torque is desired to bring the rotating or driven parts of the washing machine quickly up to whichever operating speed has been selected. For this reason the main windings 36, 38 are wired to produce maximum torque, i.e. wired for high speed operation regardless of the position of the speed selector switch 51; in the winding arrangement illustrated for motor 16, windings 36 and 38 are wired in parallel. Main winding 36, for instance, is fed from $L_1$, timer switch 112, line 186, line 44, main winding 36, line 50, line 198, bridging member 94, line 200, selector switch blade 66, low speed contact 54, intermediate relay tap line 106 and the effective actuating portion of coil 76 between tap-off points 82 and 80, and thus to $L_2$. Main winding 38 is wired in parallel with main winding 36, from $L_1$, switch 112, line 186, line 202, bridging member 90, line 204, line 48, main winding 38 to line 50 from which point the circuit is completed to $L_2$ in the same fashion as was main winding 36. In this relationship the motor 16 will now quickly accelerate from 0 r.p.m. to low running or synchronous speed of approximately 850 r.p.m. on 60 cycle current (see FIG. 4). In so accelerating with the switch 51 set for low speed operation but with the motor 16 actually connected for high speed operation, the graph illustrates the decrease in current draw (amperes) in the parallel wired running windings from approximately 22 amperes to approximately 18 amperes as the motor approaches low running speed. With low speed selected the current which flows through the main windings 36, 38 in parallel flows also through that portion of the relay actuating coil 76 between coil points 82 and 80. Although the current draw of approximately 22 amperes at the initiation of the low speed motor operation (motor windings 36, 38 connected in parallel in a manner equivalent to a high speed operation) is sufficient to actuate the relay in flowing through the reduced number of coil turns, the decreasing current draw in the main or running windings as the motor accelerates produces a continuously lessening pull-in effect on the relay armature 86. At approximately the selected low running speed of 850 r.p.m., the field generated by the selected portion of actuating coil 76 is insufficient to maintain the armature in a pulled-in relationship and the relay 74 is deenergized. Thus, the main winding relay contacts 98, 100, and start winding relay contacts 102 are broken at the same time that motor running contacts 104 are made. The motor 16 is now in a steady state synchronous low speed running condition, illustrated in FIG. 6 with the main windings in series, and is thereby drawing minimum current. It will be noted that the deenergization of relay 74 causes bridging member 96 to close a circuit which places the entire length of coil 76 in current sensing relationship to the running windings 36, 38. Thus the circuit is automatically established to sense stall conditions.

In other words the novel switching arrangement of this invention recognizes that the motor torque produced in either the start or run windings during acceleration to low running speed is below maximum value. For this reason the start winding 40 is not dropped out of the circuit until full low speed running conditions are reached. Just prior to the point of start winding drop out, current is being sensed in the portion of coil 76 between 80 and 82 while main windings 36 and 38 are connected in parallel. As the relay 74 is deenergized, circuits are established which drop out the start winding and connect the main windings 36, 38 in series. Thus the entire coil 76 is placed in the circuit to sense the reduced current draw during low speed run.

At the conclusion of the brief interval during which the motor is wired in accordance with the start circuitry of FIG. 5, relay 74 and start winding 40 are deenergized and the main windings 36, 38 placed in series running operation in accordance with the circuitry established at the termination of the starting cycle and the selection on switch 51 of low speed motor operation (FIGURE 6). In this regard, main windings 36, 38 are energized from $L_1$, timer switch 112, line 186, line 44, main windings 36, 38, line 48, line 188, selector switch blade 64, line 190, relay bridging member 96, line 192, relay actuating coil 76 to $L_2$. Since the circuitry thus established places the entire length of coil 76 in the circuit of the motor main winding, a lesser current flow through the windings of coil 76 is required to actuate the relay 74. To repeat, the pull-in of the relay armature 86 is dependent on the product of ampere draw times coil turns. Since the number of turns of coil 76 placed in the circuit by the selection of low speed is maximum under run conditions, the armature pull-in or relay actuating point is effective with a lesser current draw than is necessary to actuate the relay when the intermediate relay tap lines 106 or 108 are in the circuit.

Let us now assume that the motor 16 is operating in the selected low speed to cause the agitator 12 to gently agitate the clothing being washed in tub 14. Let us further assume that the clothing lumps or gathers in a fashion tending to bind or stall the action of agitator 12. This increased burden is transmitted through the agitating and spinning mechanism 18 to the motor 16 and consequently slows the rotational speed of the motor. As explained in connection with the motor operating characteristic graph of FIG. 4, a reduction in motor speed creates an increased current draw along with an increased availability of torque to overcome the blockage or impediment at the agitator 12. The increased current draw flows through the same circuitry just set forth for the low speed running situation of FIG. 6. However, the increased current flowing through the entire coil 76 operates to energize the relay 74, thereby breaking the motor running contacts 104 and making simultaneously therewith main winding relay contacts 98, 100 and start winding contacts 102. The circuitry now established by the automatic operation of the relay 74 in response to the changed load condition imposed by the washing machine upon the motor 16 is now identical to the low speed motor start situation illustrated in FIG. 5. In this regard the motor 16 is now wired for maximum torque (start winding energized; main windings in parallel) to overcome the condition tending to stall the motor and thus quickly to accelerate the motor to its running speed at which point the relay will again deenergize to establish the run circuitry of FIGURE 6 (start winding deenergized; main windings in series). It will be apparent from the above explanation that the motor 16 is switched automatically between a start-stall circuitry and a selected speed running circuitry without further attention by the operator or additional sensing mechanism within the timer.

Where the operator of the washing machine 10 desires a high speed washing machine operation both with reference to agitation and spin, the cabinet dial 26 is manually turned to indicate high speed which, in turn, places the speed selector switch 51 in condition for high speed operation of the motor 16. The components of the circuitry illustrated in FIG. 8 remain identical to those utilized in conjunction with the low speed operation of FIG. 5, viz. the circuit is comprised of a timer operated switch 112, a multiple tap current sensitive relay 74, a speed selector switch 51 and a multiple speed consequent pole motor 16. Motor 16, when wired in a salient or four pole arrangement, produces the high speed running condition of FIG. 7 whereas the circuitry which establishes a consequent or eight pole arrangement places the motor 16 in condition for the consequent pole low speed operation of FIG. 6. With high speed selected (FIGURE 7), the initial impulse to energize the relay 74 and to start the motor 16 is from $L_1$, switch 112, line 186, line 44, main winding 36 to line 50. In parallel relationship to main winding 36, the main winding 38 is energized by way of $L_1$, switch 112, line 206, high speed contact 58, selector switch blade 64, line 188, line 48 and main winding 38 to line 50. Thus, the windings 36, 38 are fed in parallel from line 50, selector switch blade 68, high speed contact 62, relay center tap 108, tap point 208 (tap point 208 in FIGURES 7 and 8 is the same as tap point 84 in FIGURES 2, 5 and 6) on relay actuating coil 76 to coil terminus 80 and $L_2$. This momentary impulse creates a sufficient current draw in the selected portion of coil 76 to actuate relay 74 and pull-in the armature 86 and thereby close main winding contacts 98, 100, and start winding contacts 102 by bridging members 90, 94 and 92, respectively. Simultaneously therewith, bridging member 96 opens motor running contacts 104. The start winding 40 is thus energized from $L_1$, switch 112, line 186, line 44, start winding 40, capacitor 42, line 194, bridging member 92, line 196 to $L_2$. The crcuit established to place the main windings 36 and 38 in parallel remains the same as described immediately aforesaid in connection with the impulse necessary to actuate the multiple tap relay 74. Again with reference to FIG. 4, the motor 16 will accelerate on the high speed curve from 0 r.p.m. to a speed approximately 80% of the speed value selected on switch 51, the 80% figure being the point at which motor torque is generally maximum. In this case, since high speed was selected, the motor will accelerate to approximately 1400 r.p.m. before dropping out the start winding 40. The graph of FIG. 4 clearly illustrates the decreasing current requirement as the motor speed increases. This decrease in current requirement of the motor during acceleration is sensed by that portion of the actuating coil 76 placed in the motor circuit in accordance with the position of speed selector switch 51. In high speed, the length or number of poles selected from coil 76 is that portion between tap-off points 208 and coil terminus 80. Since this number of coil turns or length of coil 76 is greater than the coil turns intercepted between tap-off point 82 and terminus 80 coil length placed in the motor circuit when selector switch 51 is on low speed (FIGURE 5), a lesser current draw is necessary to produce the same relay actuating product of amperes times coil turns. With low speed selected start winding cutout or drop-out point of relay 74 occurs when motor 16 is at approximately 700 r.p.m. On the graph, this corresponds to a higher current draw than exists at the high speed start winding cut out point. With these facts in mind it should now be apparent that a relay may be designed with a selectively sectional coil in which an armature can be made actuatable in accordance with any particular current flow through the relay.

During acceleration at the moment the current draw for motor 16 flowing in coil segment 208 to 80 falls below that figure necessary to energize the relay as predeter- 182 projects outwardly from the relay 166 to engage a contact 156 in the speed selector switch 152. Since the motor control circuit of FIG. 3 is adapted for use with a washing machine, a timer 24, similar to that referred to is connected with FIG. 2, is adapted to energize the motor control circuit whenever motor operation is required in the washing machine cycle. The operation of the circuit set forth in FIG. 3 is believed sufficiently equivalent to the automatic control concepts embodied in FIGURE 2 to be understood in conjunction with the explanation of the FIGURE 2 circuiting as described hereinafter.

In the past magnetic starting relays have been used to drop out a start winding in single speed motors as the motor comes up to speed. To accomplish this, the change in power requirements of the motor during operation sets up a changing current flow which is used to actuate the relay. However, this arrangement has not been applicable to multiple-speed motors in view of the variety of current or power requirements for the various starting and running conditions encountered in a multiple-speed motor. It is known that the pull-in of the relay core or armature is dependent on the product of amperes flowing through the relay coil times the number of turns of the coil. Since the number of coil turns is fixed in any one relay, the pull-in depends on the current draw through the coil. This invention, therefore, encompasses a more flexible actuating relay coil for use with multiple-speed motors wherein multiple taps are located intermediate the ends of the coil. Thus, the number of actuating coil turns is made selectable for the desired motor running speed. Furthermore, with multi-speed motors having a single start winding, this novel arrangement permits the start winding to drop out without first over-speeding the motor to the high speed start winding cutout point, i.e. where the operator desires to select low speed motor operation, the start winding is dropped out during acceleration at a lower motor speed than when the operator selects high speed operation.

The operating characteristics of a motor adapted to be controlled by the circuitry of this invention are depicted in graphic form in FIG. 4. With motor speed or r.p.m. arranged as the ordinate of the graph and either amperes (motor current draw) or torque (load characteristics effectively handled by a particular motor) arranged as the abscissa, it is shown that speed varies inversely as the current draw and the torque requirements of the motor.

In multiple speed washing machine operation, six operating situations confront the motor. With the speed selector 26 set for low speed operation (FIGURES 5 and 6), the motor must operate between a start situation, (FIGURE 5) a running situation (FIGURE 6), and a stall situation wherein the motor is over-burdened and must revert to a start condition (FIGURE 5). Similar circuit situations are encountered with the speed selector switch set for high speed operation, viz. start (FIGURE 8), run (FIGURE 7) and stall (FIGURE 8). The circuitry set forth in these last recited figures includes the same circuit components illustrated in FIG. 2, viz. a consequent pole motor 16, a speed selector switch 51, a multiple tap current sensitive relay 74 and a conventional timer 24 adapted to control a circuit energization switch 112. To more fully understand the circuitry set forth in FIGS. 5, 6, 7 and 8, the lines which are energized during any particular motor operating condition or circuit situation are shown heavier than those lines which are selectively deenergized.

FIG. 5 illustrates an 8-pole start arrangement for a consequent pole motor 16 wherein the main windings 36 and 38 are connected in parallel and the timer switch 112 is closed to energize the motor control circuitry. The start winding 40 and capacitor 42 are energized to produce maximum motor torque during the starting load condition. In the case of a washing machine, this load condition would be encountered when the speed selector dial 26 is set for low speed operation and the timer controlled switch 112 has just been closed by the operator in turning on the washing machine. For the situation at the instant of closing switch 112, FIG. 6 should be referred to wherein the relay coil 76 is energized momentarily by means of $L_1$, switch 112, line 186, line 44, main winding 36, main winding 38, line 48, line 188, selector switch blade 64, low speed contact 52, line 190, deenergized relay bridging member 96, line 192, coil 76 (entire coil selected between coil termini 78, 80) to $L_2$. This arrangement completes a circuit through the coil 76 to energize the relay 74 in a manner to pull-in the armature 86, thereby closing main winding relay contacts 98 with bridging member 90, start winding relay contacts 102 with bridging member 92 and main winding relay contacts 100 with bridging member 94. Simultaneously, the circuit initiating contacts 104 are broken with the energization of the relay 74 and the removal of bridging member 96.

The circuitry is now established to place the motor 16 in condition for starting (FIGURE 5). The start winding 40 is now energized by way of $L_1$, switch 112, line 186, line 44, start winding 40, capacitor 42, line 194, bridging member 92, line 196 to $L_2$. It will be apparent that the circuit energizing the start winding 40 bypasses the actuating coil 76 of the relay 74 and is therefore without effect upon the actuation of the relay 74. Under a start situation, the high torque is desired to bring the rotating or driven parts of the washing machine quickly up to whichever operating speed has been selected. For this reason the main windings 36, 38 are wired to produce maximum torque, i.e. wired for high speed operation regardless of the position of the speed selector switch 51; in the winding arrangement illustrated for motor 16, windings 36 and 38 are wired in parallel. Main winding 36, for instance, is fed from $L_1$, timer switch 112, line 186, line 44, main winding 36, line 50, line 198, bridging member 94, line 200, selector switch blade 66, low speed contact 54, intermediate relay tap line 106 and the effective actuating portion of coil 76 between tap-off points 82 and 80, and thus to $L_2$. Main winding 38 is wired in parallel with main winding 36, from $L_1$, switch 112, line 186, line 202, bridging member 90, line 204, line 48, main winding 38 to line 50 from which point the circuit is completed to $L_2$ in the same fashion as was main winding 36. In this relationship the motor 16 will now quickly accelerate from 0 r.p.m. to low running or synchronous speed of approximately 850 r.p.m. on 60 cycle current (see FIG. 4). In so accelerating with the switch 51 set for low speed operation but with the motor 16 actually connected for high speed operation, the graph illustrates the decrease in current draw (amperes) in the parallel wired running windings from approximately 22 amperes to approximately 18 amperes as the motor approaches low running speed. With low speed selected the current which flows through the main windings 36, 38 in parallel flows also through that portion of the relay actuating coil 76 between coil points 82 and 80. Although the current draw of approximately 22 amperes at the initiation of the low speed motor operation (motor windings 36, 38 connected in parallel in a manner equivalent to a high speed operation) is sufficient to actuate the relay in flowing through the reduced number of coil turns, the decreasing current draw in the main or running windings as the motor accelerates produces a continuously lessening pull-in effect on the relay armature 86. At approximately the selected low running speed of 850 r.p.m., the field generated by the selected portion of actuating coil 76 is insufficient to maintain the armature in a pulled-in relationship and the relay 74 is deenergized. Thus, the main winding relay contacts 98, 100, and start winding relay contacts 102 are broken at the same time that motor running contacts 104 are made. The motor 16 is now in a steady state synchronous low speed running condition, illustrated in FIG. 6 with the main windings in series, and is thereby drawing minimum current. It will be noted that the deenergization of relay 74 causes bridging member 96 to close a circuit which places the entire length of coil 76 in current sensing relationship to the running windings 36, 38. Thus the circuit is automatically established to sense stall conditions.

In other words the novel switching arrangement of this invention recognizes that the motor torque produced in either the start or run windings during acceleration to low running speed is below maximum value. For this reason the start winding 40 is not dropped out of the circuit until full low speed running conditions are reached. Just prior to the point of start winding drop out, current is being sensed in the portion of coil 76 between 80 and 82 while main windings 36 and 38 are connected in parallel. As the relay 74 is deenergized, circuits are established which drop out the start winding and connect the main windings 36, 38 in series. Thus the entire coil 76 is placed in the circuit to sense the reduced current draw during low speed run.

At the conclusion of the brief interval during which the motor is wired in accordance with the start circuitry of FIG. 5, relay 74 and start winding 40 are deenergized and the main windings 36, 38 placed in series running operation in accordance with the circuitry established at the termination of the starting cycle and the selection on switch 51 of low speed motor operation (FIGURE 6). In this regard, main windings 36, 38 are energized from $L_1$, timer switch 112, line 186, line 44, main windings 36, 38, line 48, line 188, selector switch blade 64, line 190, relay bridging member 96, line 192, relay actuating coil 76 to $L_2$. Since the circuitry thus established places the entire length of coil 76 in the circuit of the motor main winding, a lesser current flow through the windings of coil 76 is required to actuate the relay 74. To repeat, the pull-in of the relay armature 86 is dependent on the product of ampere draw times coil turns. Since the number of turns of coil 76 placed in the circuit by the selection of low speed is maximum under run conditions, the armature pull-in or relay actuating point is effective with a lesser current draw than is necessary to actuate the relay when the intermediate relay tap lines 106 or 108 are in the circuit.

Let us now assume that the motor 16 is operating in the selected low speed to cause the agitator 12 to gently agitate the clothing being washed in tub 14. Let us further assume that the clothing lumps or gathers in a fashion tending to bind or stall the action of agitator 12. This increased burden is transmitted through the agitating and spinning mechanism 18 to the motor 16 and consequently slows the rotational speed of the motor. As explained in connection with the motor operating characteristic graph of FIG. 4, a reduction in motor speed creates an increased current draw along with an increased availability of torque to overcome the blockage or impediment at the agitator 12. The increased current draw flows through the same circuitry just set forth for the low speed running situation of FIG. 6. However, the increased current flowing through the entire coil 76 operates to energize the relay 74, thereby breaking the motor running contacts 104 and making simultaneously therewith main winding relay contacts 98, 100 and start winding contacts 102. The circuitry now established by the automatic operation of the relay 74 in response to the changed load condition imposed by the washing machine upon the motor 16 is now identical to the low speed motor start situation illustrated in FIG. 5. In this regard the motor 16 is now wired for maximum torque (start winding energized; main windings in parallel) to overcome the condition tending to stall the motor and thus quickly to accelerate the motor to its running speed at which point the relay will again deenergize to establish the run circuitry of FIGURE 6 (start winding deenergized; main windings in series). It will be apparent from the above explanation that the motor 16 is switched automatically between a start-stall circuitry and a selected speed running circuitry without further attention by the operator or additional sensing mechanism within the timer.

Where the operator of the washing machine 10 desires a high speed washing machine operation both with reference to agitation and spin, the cabinet dial 26 is manually turned to indicate high speed which, in turn, places the speed selector switch 51 in condition for high speed operation of the motor 16. The components of the circuitry illustrated in FIG. 8 remain identical to those utilized in conjunction with the low speed operation of FIG. 5, viz. the circuit is comprised of a timer operated switch 112, a multiple tap current sensitive relay 74, a speed selector switch 51 and a multiple speed consequent pole motor 16. Motor 16, when wired in a salient or four pole arrangement, produces the high speed running condition of FIG. 7 whereas the circuitry which establishes a consequent or eight pole arrangement places the motor 16 in condition for the consequent pole low speed operation of FIG. 6. With high speed selected (FIGURE 7), the initial impulse to energize the relay 74 and to start the motor 16 is from $L_1$, switch 112, line 186, line 44, main winding 36 to line 50. In parallel relationship to main winding 36, the main winding 38 is energized by way of $L_1$, switch 112, line 206, high speed contact 58, selector switch blade 64, line 188, line 48 and main winding 38 to line 50. Thus, the windings 36, 38 are fed in parallel from line 50, selector switch blade 68, high speed contact 62, relay center tap 108, tap point 208 (tap point 208 in FIGURES 7 and 8 is the same as tap point 84 in FIGURES 2, 5 and 6) on relay actuating coil 76 to coil terminus 80 and $L_2$. This momentary impulse creates a sufficient current draw in the selected portion of coil 76 to actuate relay 74 and pull-in the armature 86 and thereby close main winding contacts 98, 100, and start winding contacts 102 by bridging members 90, 94 and 92, respectively. Simultaneously therewith, bridging member 96 opens motor running contacts 104. The start winding 40 is thus energized from $L_1$, switch 112, line 186, line 44, start winding 40, capacitor 42, line 194, bridging member 92, line 196 to $L_2$. The circuit established to place the main windings 36 and 38 in parallel remains the same as described immediately aforesaid in connection with the impulse necessary to actuate the multiple tap relay 74. Again with reference to FIG. 4, the motor 16 will accelerate on the high speed curve from 0 r.p.m. to a speed approximately 80% of the speed value selected on switch 51, the 80% figure being the point at which motor torque is generally maximum. In this case, since high speed was selected, the motor will accelerate to approximately 1400 r.p.m. before dropping out the start winding 40. The graph of FIG. 4 clearly illustrates the decreasing current requirement as the motor speed increases. This decrease in current requirement of the motor during acceleration is sensed by that portion of the actuating coil 76 placed in the motor circuit in accordance with the position of speed selector switch 51. In high speed, the length or number of poles selected from coil 76 is that portion between tap-off points 208 and coil terminus 80. Since this number of coil turns or length of coil 76 is greater than the coil turns intercepted between tap-off point 82 and terminus 80 coil length placed in the motor circuit when selector switch 51 is on low speed (FIGURE 5), a lesser current draw is necessary to produce the same relay actuating product of amperes times coil turns. With low speed selected start winding cutout or drop-out point of relay 74 occurs when motor 16 is at approximately 700 r.p.m. On the graph, this corresponds to a higher current draw than exists at the high speed start winding cut out point. With these facts in mind it should now be apparent that a relay may be designed with a selectively sectional coil in which an armature can be made actuatable in accordance with any particular current flow through the relay.

During acceleration at the moment the current draw for motor 16 flowing in coil segment 208 to 80 falls below that figure necessary to energize the relay as predetermined by the particular relay design, the relay armature 86 will drop out to close motor running circuits 104 and thereby deenergize main winding relay contacts 98, 100 and relay start contacts 102. Thus, the circuitry established has placed the motor 16 in condition for high speed running operation, in accordance with FIG. 7. In this regard, main winding 36 is energized from L₁, switch 112, line 186, line 44, main winding 36 to line 50. In parallel relationship thereto main winding 38 is fed from L₁, timer switch 112, line 206, high speed contact 58, selector switch blade 64, line 188, line 48 and main winding 38 to line 50. From line 50 the motor running circuit is completed through selector switch blade 68, high speed contact 62, relay intermediate tap line 108, actuating coil segment 208 to 80 and thus to L₂. The motor will continue to be energized in this fashion for high speed operation so long as the timer 24 calls for motor operation and no situation arises tending to stall the motor.

Let us now assume the washing machine timer 24 has progressed to a point where a spin cycle is initiated. The increased load of bringing a water filled tub up to centrifuging speed is equivalent to a stall condition and the circuitry of FIG. 8 is established by the energization of relay 74 to accelerate the motor 16 throughout the high torque range until a substantial portion of the water has been spun from tub 14, the motor current draw decreased and the relay 74 deenergized. The tub is now spinning at a high speed in accordance with the high speed selection for motor 16 and the circuitry of FIGURE 7. If any unbalance or impediment occurs during the spinning action, this resistance to rotation will be transmitted to the motor 16 in the form of a decreased rotational speed. As motor speed decreases, the current requirements of the motor increase and this current increase is sensed by the number of coil turns selected upon relay actuating coil 76. When this current draw reaches a predetermined value in accordance with the number of turns selected, the relay 74 will again be actuated and the armature 86 pulled in to place the circuitry in a start or stall condition, as illustrated in FIG. 8. The high torque circuitry of FIG. 8 is thus automatically utilized to effect a reacceleration of motor 16 to the desired operating speed selected on switch 51, whenever motor load conditions require.

It should now be apparent that a switching arrangement for a multiple-speed motor and circuitry therefor has been provided in a manner to cause the operating characteristics of the motor automatically to place the motor in condition to meet all load requirements without the addition of auxiliary condition sensing and/or corrective devices.

The novel circuitry of this invention has been explained in connection with a washing machine transmission having a two-speed agitate and a two-speed spin cycle. For example, this switching circuit is adapted for use with a washing machine agitating and spinning mechanism 18 wherein a rotation of a portion of the device in one direction is adapted to produce an agitating action at agitator 12 and whereby a rotation in the opposite direction is adapted to produce a spinning action of tub 14. This mechanism is more fully taught in the patent to Sisson 2,758,685. Of course, motor 16 would necessarily be of a reversible type to operate the patented mechanism. It is believed to be conventional to supplement the wiring circuitry as taught with a timer operated reversing switch, to provide reversible operation for motor 16.

Although the motor control circuitry of this application has been made responsive to variations in motor power requirements, substantially similar motor operation is achieved in response to a centrifugally actuated switching arrangement as taught in my copending application Serial No. 745,152 filed concurrently herewith.

While the embodiment of the present invention as herein disclosed constitutes a preferred form, it is to be understood that other forms might be adopted.

What is claimed is as follows:

1. In a washing machine having a tub, means for spinning said tub under a plurality of load conditions, said means including a spin mechanism, a two-speed motor connected directly to said mechanism and a control circuit, said circuit including means for initiating a spin cycle by energizing said motor for high speed, high torque operation to bring the spin speed up to a predetermined value for one of said load conditions, and means for automatically selectively shifting said motor for low speed, low torque operation for another of said load conditions at a delayed time after initiation, said last named means including means in power supply relationship to said motor when said motor is in low speed, low torque operation and actuatable with said initiating means in response to power supplied to said motor to reshift said motor for high speed, high torque operation in accordance with said load conditions.

2. In a laundry appliance having a container, means for motivating said container under a plurality of load conditions, said means including a spin mechanism, a multi-speed motor connected directly to said mechanism and a control circuit said circuit including means for initiating a motivation by energizing said motor for high speed, high torque operation to bring the motivation speed up to a predetermined value for one of said load conditions, and means operative at a delayed time after initiation for selectively shifting said motor for low speed, low torque operation for another of said load conditions, said last named means including means in power supply relationship to said motor when said motor is in said low speed, low torque operation and actuatable with said initiating means in response to power supplied to said motor to reshift said motor for high speed, high torque operation in accordance with said load conditions.

3. In an appliance having a portion adapted for multi-speed operation, means for motivating said portion under a plurality of load conditions, said means including a spin mechanism, a multi-speed motor connected directly to said mechanism and a control circuit, said circuit including means for initiating a motivation by energizing said motor for high speed, high torque operation to bring the motivation speed up to a predetermined value for one of said load conditions, and means operative at a delayed time after initiation for selectively shifting said motor for low speed, low torque operation for another of said load conditions, said last named means including means in power supply relationship to said motor when said motor is in low speed, low torque operation and actuatable with said initiating means in response to power supplied to said motor to reshift said motor for high speed, high torque operation in accordance with said load conditions.

4. In a control circuit for a washing machine having a tub, a spin mechanism selectively connected to said tub, a multi-speed motor connected directly to said mechanism for spinning said tub, a source of power for operating said motor, said motor including a starting winding and a running winding, a speed selector interposed in electrical flow relationship between said source of power and said motor and having a high speed position wherein said speed selector connects said power source to said running winding in one manner and a low speed position wherein said speed selector connects said power source to said running winding in another manner, an electrical relay having an actuating coil, a motor starting and motor running set of contacts interposed in electrical flow relationship between said speed selector and said running winding, and an armature adapted to engage either of said starting or running sets of contacts, a speed selector line connecting one of said positions to an intermediate point on said coil, whereby a portion of said coil is placed in series with said speed selector in said low speed position, means for connecting the end point of said coil to the speed selector in said high speed position, said armature thereby made responsive to different power requirements of said motor in accordance with the position of said speed selector.

5. In a washing machine having a tub, means for spinning said tub under different load conditions, said means including a spin mechanism, a motor connected directly to said mechanism and a control circuit, said motor having a plurality of operating torques and running speeds, said control circuit including a timer switch, a speed selector switch and a motor current sensitive switch including a multiple tapped relay in series with said motor, said timer switch operating to initiate a spinning of the tub, said speed selector switch preset to energize said motor for high torque and for one of said running speeds and said motor current sensitive switch, at a delayed time, after initiation, selectively shifting said motor for low torque and another of said running speeds and, in response to load condition, reshifting said motor for high torque operation.

6. In a control circuit for a washing machine having a tub, a spin mechanism selectively connected to said tub, a multi-speed motor connected directly to said mechanism for spinning said tub, a source of power for operating said motor, said motor including a starting winding and a pair of running windings, a speed selector interposed in electrical flow relationship between said source of power and said motor and having a high speed position wherein said speed selector connects said power source to one of said running windings and a low speed position wherein said speed selector connects said power source to the other of said running windings, an electrical relay having an actuating coil, a motor starting set of contacts and a motor running set of contacts interposed in electrical flow relationship between said speed selector and each of said running windings respectively, and an armature adapted to engage either of said sets of contacts, a speed selector line connecting an intermediate point on said coil to the speed selector in said low speed position, whereby one portion of said coil is placed in series with said speed selector and one of said running windings, means for connecting the end point of said coil to the speed selector in said high speed position, whereby a greater portion of said coil is placed in series with said speed selector and the other of said running windings, said armature thereby made responsive to different power requirements of said motor in accordance with the position of said speed selector.

7. In a control circuit for a washing machine having a tub, a spin mechanism selectively connected to said tub, a multispeed motor connected directly to said mechanism for spinning said tub, a source of power for operating said motor, said motor including a starting winding and a pair of running windings, a speed selector interposed in electrical flow relationship between said source of power and said motor and having a high speed position wherein said speed selector connects said power source to said running windings in one manner and a low speed position wherein said speed selector connects said power source to said running windings in another manner, an electrical relay having an actuating coil, a motor starting set of contacts and a motor running set of contacts interposed in electrical flow relationship between said speed selector and said running windings respectively, and an armature adapted to engage either of said sets of contacts, a speed selector line connecting one point on said coil to the speed selector in said low speed position, whereby one portion of said coil is placed in series with said speed selector and said running windings, means for connecting another point of said coil to the speed selector in said high speed position, whereby a different portion of said coil is placed in series with said speed selector and said running windings, said armature thereby made responsive to different power requirements of said motor in accordance with the position of said speed selector.

8. In a control circuit for a washing machine having a tub, a spin mechanism selectively connected to said tub, a consequent pole motor connected directly to said mechanism for spinning said tub, a source of power for operating said motor, said motor including a starting winding and first and second main windings, a speed selector interposed in electrical flow relationship between said source of power and said motor and having a high speed position wherein said speed selector connects said power source to said main windings in parallel and a low speed position wherein said speed selector connects said power source to said main windings in series, an electrical relay having an actuating coil, a motor starting set of contacts and a motor running set of contacts interposed in electrical flow relationship between said speed selector and said main windings respectively, and an armature adapted to engage either of said sets of contacts, a speed selector line connecting an intermediate point on said coil to the speed selector in said low speed position, whereby one portion of said coil is placed in series with said speed selector and said main windings in parallel, means for connecting another point of said coil to the speed selector in said high speed position, whereby a greater portion of said coil is placed in series with said motor running set of contacts, said speed selector and said main windings, said armature thereby made responsive to different power requirements of said motor in accordance with the position of said speed selector.

References Cited in the file of this patent

UNITED STATES PATENTS

| | | |
|---|---|---|
| 520,764 | Bell | June 5, 1894 |
| 1,880,565 | Weichsel | Oct. 4, 1932 |
| 1,886,895 | Meyer | Nov. 8, 1932 |
| 2,269,069 | Werner | Jan. 6, 1942 |
| 2,393,958 | Blankenship et al. | Feb. 5, 1946 |
| 2,689,933 | Veinott | Sept. 21, 1954 |
| 2,774,924 | Witt | Dec. 18, 1956 |
| 2,826,727 | Strachan | Mar. 11, 1958 |
| 2,841,003 | Conlee | July 1, 1958 |
| 2,881,633 | Warhus | Apr. 14, 1959 |